(12) United States Patent
Redemann

(10) Patent No.: US 12,404,908 B2
(45) Date of Patent: Sep. 2, 2025

(54) DEVICE WITH A SENSOR AND A CIRCLIP FOR INDICATING WEAR OF A BRAKE LINING OF A DISC BRAKE, AND CIRCLIP

(71) Applicant: ZF CV Systems Europe BV, Brussels (BE)

(72) Inventor: Bernward Redemann, Hockenheim (DE)

(73) Assignee: ZF CV Systems Europe BV, Brussels (BE)

( * ) Notice: Subject to any disclaimer, the term of this patent is extended or adjusted under 35 U.S.C. 154(b) by 98 days.

(21) Appl. No.: 18/282,013

(22) PCT Filed: Mar. 1, 2022

(86) PCT No.: PCT/EP2022/055115
§ 371 (c)(1),
(2) Date: Sep. 14, 2023

(87) PCT Pub. No.: WO2022/194537
PCT Pub. Date: Sep. 22, 2022

(65) Prior Publication Data
US 2024/0167527 A1    May 23, 2024

(30) Foreign Application Priority Data
Mar. 15, 2021  (DE) ................. 10 2021 106 219.5

(51) Int. Cl.
*F16D 66/02* (2006.01)
*F16D 65/00* (2006.01)

(52) U.S. Cl.
CPC ....... *F16D 66/024* (2013.01); *F16D 65/0043* (2013.01)

(58) Field of Classification Search
CPC ... F16D 65/0043; F16D 66/022; F16D 66/024
See application file for complete search history.

(56) References Cited

U.S. PATENT DOCUMENTS 3,600,764 A * 8/1971 Froehlich ................ D06F 55/00
                                                    223/96
3,758,923 A    9/1973 Maude
(Continued)

FOREIGN PATENT DOCUMENTS

DE          3904673 A1     8/1990
DE         19825300 A1    12/1999
(Continued)

OTHER PUBLICATIONS

European Patent Office, Rijswijk, Netherlands, International Search Report of International Application No. PCT/EP2022/055115, Mailed Jun. 22, 2022, 2 pages.

*Primary Examiner* — John A Tweel, Jr.
(74) *Attorney, Agent, or Firm* — Dickinson Wright PLLC

(57) ABSTRACT

A device for indicating the wear of a brake lining of a disc brake, which triggers a signal when a wear limit of the brake lining is reached, includes a circlip (10) and a sensor (32) with a sensor head (34). The sensor (32) can be fastened in a bore of the brake lining and has a groove (36) that receives the circlip (10) to secure the sensor (32) on the brake lining. The groove (36) has a flattened region, and the shape of the circlip (10) is adapted to the flattened region. The circlip (10) has a region (12) which has a uniformly round curvature, and has bends (18, 20) in the direction of a centre (25) of the circlip (10) at the ends (14, 16) of this region (12). End pieces (22, 24) extend from the bends (18, 20) and have straight regions that are parallel and aligned.

18 Claims, 1 Drawing Sheet

(56) References Cited

U.S. PATENT DOCUMENTS

| | | | | |
|---|---|---|---|---|
| 5,347,858 A | * | 9/1994 | Ito | F16D 66/024 |
| | | | | 73/129 |
| D426,425 S | * | 6/2000 | Hermanski | D7/400 |
| 6,276,494 B1 | * | 8/2001 | Ward | F16D 66/026 |
| | | | | 188/71.9 |

FOREIGN PATENT DOCUMENTS

| | | | |
|---|---|---|---|
| DE | 69810876 T2 | | 8/2003 |
| DE | 102008019264 A1 | | 10/2009 |
| DE | 102011103696 B3 | | 12/2012 |
| DE | 102015211176 A1 | | 12/2015 |
| DE | 102018105057 A1 | | 9/2019 |
| FR | 994526 A | | 11/1951 |
| GB | 649860 A | | 2/1951 |
| JP | H1047397 A | * | 2/1998 |
| JP | 2000220676 A | * | 8/2000 |
| WO | 9725539 A1 | | 7/1997 |
| WO | 2012052121 A1 | | 4/2012 |

* cited by examiner

DEVICE WITH A SENSOR AND A CIRCLIP FOR INDICATING WEAR OF A BRAKE LINING OF A DISC BRAKE, AND CIRCLIP

FIELD

The present disclosure relates to a device for indicating wear on a brake lining of a disc brake, such as those used in commercial vehicles, for example in trucks, trailers or buses.

BACKGROUND

Disc brakes in motor vehicles have brake linings that, depending on an actuation of a braking-value transmitter, are pressed by an actuator onto a brake disc connected to a wheel to be braked, so as to enable a braking effect to be transmitted to the brake disc and the wheel during a braking operation. The brake linings have friction linings that wear as a result of the braking operations.

It is desirable to replace a brake lining when its friction lining has worn down to a predefined wear limit. Commercial vehicles, in particular, therefore often have a brake-lining wear indicator that alerts a driver of the commercial vehicle of wear on a brake lining.

A disc brake having such a brake-lining wear indicator is known, for example, from WO 2012/052121 A1.

DE 39 04 673 A1 discloses a device for indicating the wear on a friction lining of a brake lining of a disc brake, which has an electrically conductive means that comes into electrical contact with the brake disc when a predefined wear limit is reached during braking. The device has a sensor that is inserted into a bore of the disc brake and is fastened in the bore via a circlip. The circlip secures the sensor in the bore with a preload, such that the sensor cannot twist or shift when the commercial vehicle is being driven.

For example, round-wire circlips are used to secure such a sensor in a brake lining. A special pair of pliers is required for mounting such a circlip. Even with special pliers, however, mounting a circlip is a difficult matter. Circlips of this type are also known as securing rings, spring rings or snap rings.

SUMMARY

It is therefore an object of the present disclosure to specify a device of the aforementioned type, for indicating wear on a brake lining of a disc brake, which has a simplified mounting.

This object is achieved by a device for indicating wear on a brake lining of a disc brake according to the present disclosure, by a circlip according to the present disclosure, and by a commercial vehicle according to the present disclosure.

The embodiments of the present disclosure include advantageous developments and improvements of the present disclosure as set out in the following description of these measures.

The present disclosure relates to a device for indicating the wear on a brake lining of a disc brake, which triggers a signal when the brake lining reaches a predefined wear limit. The device includes a circlip and a sensor comprising a sensor head that has a groove for receiving the circlip for the purpose of securing the sensor to the brake lining. The sensor head in this case can be fastened in a bore in the brake lining. The groove has a flattened region, and the shape of the circlip is matched to the flattened region.

In a preferred exemplary embodiment, the circlip has a round region of uniform curvature that is delimited by two ends, wherein the two ends each have a bend in the direction of a center of the circlip defined by the circular region.

In a further preferred exemplary embodiment, each end of the round region delimits a respective end piece of the circlip from the round region, wherein each end piece has a straight region, and the two straight regions are parallel to each other and extend along a straight line.

In a further preferred exemplary embodiment, the sensor head has a cylindrical shape, and the groove extends around a circumference of the sensor head.

In a further preferred exemplary embodiment, the flattened region of the groove has a straight region, and the shape of the circlip is matched to the straight region the groove.

The flattened region of the groove and the further course of the groove, as well as the round region and the two flattened regions of the circlip, are in particular designed in such a way that the circlip locks into the groove with a close fit.

In a further preferred exemplary embodiment, the circlip is delimited by end faces, each of which has a perpendicular sectional surface with respect to the circumference of the circlip, wherein the end faces are opposite each other in a plane-parallel manner.

The present disclosure furthermore relates to a circlip, which has a region of uniformly round curvature, and which, at the ends of this region, has a respective bend in the direction of a center of the circlip.

In a preferred exemplary embodiment of the circlip, two end pieces of the circlip are delimited from the round region of the circlip by the bends, wherein each end piece has a straight region, and the two straight regions are parallel to each other and extend along a straight line.

In a further preferred exemplary embodiment, the circlip is composed of a round spring-steel wire of constant cross-section.

The circlip can be used in particular for a device according to the present disclosure for indicating the wear on a brake lining of a disc brake.

A device of this type facilitates mounting of the sensor on a brake lining of a disc brake. The flattened end pieces of the circlip in this case allow defined positioning of the circlip in the groove of the sensor head.

The present disclosure furthermore relates to a commercial vehicle, in particular a truck or a trailer, having a device according to the present disclosure for indicating the wear on a brake lining of a disc brake.

BRIEF DESCRIPTION OF THE DRAWINGS

Exemplary embodiments of the present disclosure are represented schematically in the drawings and are explained in greater detail below with reference to the figures.

In the figures.

DETAILED DESCRIPTION

The present description illustrates the principles of the disclosure according to aspects of the present disclosure. It is thus understood that persons skilled in the art will be able to design various arrangements which, although not explicitly described herein, nevertheless embody principles of the present disclosure and are intended to be likewise protected within its scope.

Figure 1:
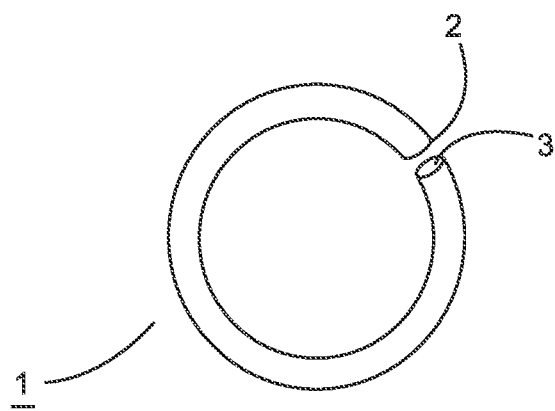
FIG. 1 shows a circlip according to the prior art.

Represented in a top view in FIG. 1 is a circlip 1 according to the prior art, which has a uniformly bent circular curvature extending to its ends 2, 3. The circlip 1 is preferably made of a round steel wire.

The circlip 1 may be used, for example, to fasten a sensor of a brake-lining wear indicator to a disc brake. For this purpose, it is inserted into a groove of the sensor. Special pliers are required for mounting such a circlip 1. Due to its free ends, however, it is still possible for the circlip 1 to become jammed in the groove during mounting.

Figure 2:
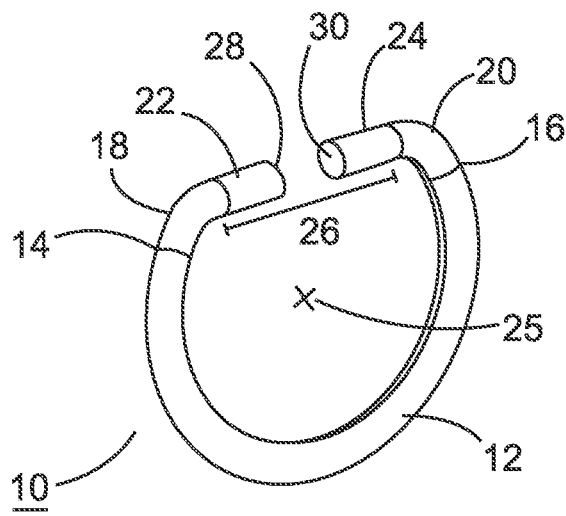
FIG. 2 shows a circlip according to the present disclosure.

A circlip 10 according to the present disclosure is represented schematically in FIG. 2. The circlip 10 has a region 12 of uniformly bent circular curvature, the region 12 being delimited at each of its ends 14, 16 by a bend 18 and 20, respectively. Two end pieces 22, 24 of the circlip 10 are thereby delimited from the circular region 12 by the bends 18, 20. The bends 18, 20 are in this case bent inward in the direction of a center 25 of the circlip 10 defined by the circular region 12. The end pieces 22, 24 of the circlip 10 are flattened.

In particular, the flattened end pieces 22, 24 each have a straight region, indicated by a distance 26. The circlip 10 is delimited by end faces 28, 30, the end faces 28, 30 in this exemplary embodiment being opposite each other in a plane-parallel manner because of the bends 18, 20, because here the straight regions of the end pieces 22, 24 lie on a straight line parallel to each other, and the end faces 28, 30 have perpendicular sectional surfaces.

The circlip 10 may be used, in particular, to fasten a sensor to a brake lining of a disc brake.

Figure 3:
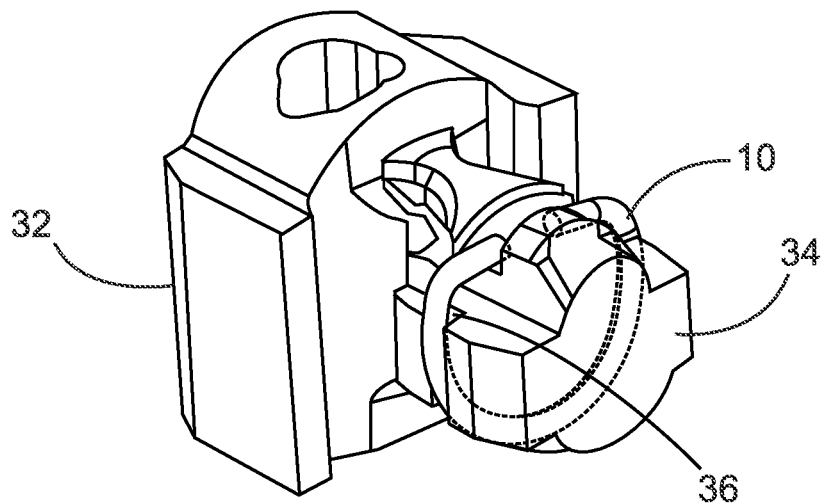
FIG. 3 shows the circlip of FIG. 2 and a sensor of a device according to the present disclosure for indicating the wear on a brake linking of a disc brake.

Shown schematically in FIG. 3 is a sensor 32 of a device according to the present disclosure for indicating the wear on a brake lining of a disc brake, which has a cylindrical sensor head 34 by which the sensor 32 can be fastened to a brake lining of a disc brake, not represented in FIG. 3. For this purpose, the sensor head 34 is pushed, for example, into a bore of the brake lining, and then secured by the circlip 10. The sensor head 34 can be fastened by the circlip 10, in particular with a preload in the bore of the brake lining, such that the sensor 32 is secured against twisting and shifting.

The sensor 32 has a groove 36, extending around the circumference of the sensor head 34, for receiving the circlip 10. In particular, the groove 36 has a straight region, which is suitably dimensioned to correspond to the straight end pieces 22, 24 of the circlip 10. The straight region of the groove 36 and the further course of the groove 36, as well as the circular region 12 and the flattened end pieces 22, 24 of the circlip 10, are in particular shaped such that the circlip 10 locks into the groove 36 with a close fit.

The circlip 10 allows the sensor 32 to be detachably fastened to a brake lining.

The circlip 10 is preferably a round-wire circlip and is made, for example, from a round steel wire, in particular a spring wire.

All examples mentioned herein, as well as conditional formulations, are to be understood as being without limitation to such specifically indicated exemplary embodiments. The disclosure is not limited to the exemplary embodiments described herein. There is scope for various adaptations and modifications that a person skilled in the art would consider, based on their knowledge of the art, as also pertaining to the disclosure.

LIST OF REFERENCE DESIGNATIONS (PART OF DESCRIPTION)

1 circlip
2, 3 ends of the circlip 1
10 circlip
12 region of uniform curvature
14, 16 ends of the region 12
18, 20 bends
22, 24 end pieces of the circlip 10
25 center of the circlip 10
26 distance
28, 30 end faces of the circlip 10
32 sensor
34 sensor head
36 groove

The invention claimed is:

1. A device for indicating the wear on a brake lining of a disc brake, which triggers a signal when the brake lining reaches a predefined wear limit, comprising:
   a circlip (10), and
   a sensor (32) having a sensor head (34) configured to be fastened in a brake lining, wherein the sensor has a groove (36) that receives the circlip (10), for securing the sensor (32) to the brake lining,
   wherein the groove (36) has a flattened region, and the shape of the circlip (10) is matched to the flattened region;
   wherein the groove extends circumferentially around the sensor head,
   wherein the circlip includes two end portions defining two opposite terminal ends of the circlip;
   wherein each of the terminal ends are disposed in the flattened region of the groove.

2. The device as claimed in claim 1, wherein the circlip (10) has a round region (12) of uniform curvature, and wherein the round region (12) is delimited by the two end portions, and the two end portions each bend (18, 20) inward relative to the round region in the direction of a center (25) of the circlip (10) defined by the round region (12).

3. The device as claimed in claim 2, wherein each end portion includes a bend portion and an end piece (22, 24) of the circlip (10), wherein each bend portion extends from the round region (12) to the end piece.

4. The device as claimed in claim 3, wherein each end piece (22, 24) has a straight region, and the two straight regions are parallel to each other and extend along a straight line.

5. The device as claimed in claim 1, wherein the sensor head (34) has a cylindrical shape, and the groove (36) extends around a circumference of the sensor head (34).

6. The device as claimed in claim 4, wherein the flattened region of the groove (36) has a straight region, and the shape of the circlip (10) is matched to the straight region of the groove (36).

7. The device as claimed in claim 6, wherein the flattened region of the groove (36) and a further course of the groove (36), as well as the round region (12) and the two end pieces (22, 24) of the circlip (36), are arranged such that the circlip (10) locks into the groove (36) with a close fit.

8. The device as claimed in claim 1, wherein the device is installed in a commercial vehicle, in particular a truck or a trailer.

9. A device for indicating the wear on a brake lining of a disc brake, which triggers a signal when the brake lining reaches a predefined wear limit, comprising:
   a circlip (10), and a sensor (32) having a sensor head (34) configured to be fastened in a brake lining, wherein the sensor has a groove (36) that receives the circlip (10), for securing the sensor (32) to the brake lining, wherein the groove (36) has a flattened region, and the shape of the circlip (10) is matched to the flattened region;

wherein the circlip (10) has a round region (12) of uniform curvature, and wherein the round region (12) is delimited by two ends (14, 16), and the two ends (14, 16) each have a bend (18, 20) in the direction of a center (25) of the circlip (10) defined by the round region (12);

wherein each end (14, 16) of the round region (12) delimits a respective end piece (22, 24) of the circlip (10) from the round region (12);

wherein each end piece (22, 24) has a straight region, and the two straight regions are parallel to each other and extend along a straight line:

wherein the circlip (10) is delimited by end faces (28, 30), each of which has a perpendicular sectional surface with respect to the circumference of the circlip (10), and wherein the end faces (28, 30) are opposite each other in a plane-parallel manner.

10. A circlip (10) for being received in a corresponding groove of a sensor, the circlip comprising:

a round region (12) of uniformly round curvature being delimited at ends (14, 16);

respective bends (18, 20) at each of the ends (14, 16) of the region (12), wherein each respective bend (18, 20) is directed radially inwardly relative to the round region (12) toward a center (25) of the circlip (10);

wherein two end pieces (22, 24) of the circlip (10) are delimited by the bends (18, 20), wherein each end piece (22, 24) has a straight region, and the two straight regions are parallel to each other and extend along a straight line;

wherein the circlip (10) is delimited by end faces (28, 30), each of which has a perpendicular sectional surface with respect to the circumference of the circlip (10), and wherein the end faces (28, 30) are opposite each other in a plane-parallel manner.

11. The circlip (10) as claimed in claim 10, wherein the circlip (10) is composed of a spring-steel wire of constant cross-section.

12. The circlip (10) as claimed in claim 10, wherein the circlip is attached to a sensor (32) configured to detect a predefined wear limit of a brake lining.

13. The circlip as claimed in claim 12, wherein the sensor (32) includes a groove having a shape corresponding to that of the circlip.

14. The circlip as claimed in claim 12, wherein the sensor includes a sensor head (34) configured to be fastened in a brake lining, wherein the sensor has a groove (36) that receives the circlip (10), for securing the sensor (32) to the brake lining, wherein the groove (36) has a flattened region, and the shape of the circlip (10) is matched to the flattened region.

15. The circlip as claimed in claim 14, wherein each end (14, 16) of the round region (12) delimits a respective end piece (22, 24) of the circlip (10) from the round region (12).

16. The circlip as claimed in claim 15, wherein each end piece (22, 24) has a straight region, and the two straight regions are parallel to each other and extend along a straight line.

17. The circlip as claimed in claim 14, wherein the flattened region of the groove (36) has a straight region, and the shape of the circlip (10) is matched to the straight region of the groove (36).

18. The circlip as claimed in claim 17, wherein the flattened region of the groove (36) and a further course of the groove (36), as well as the round region (12) and the two end pieces (22, 24) of the circlip (36), are arranged such hat the circlip (10) locks into the groove (36) with a close fit.

\* \* \* \* \*